United States Patent [19]

Mumford

[11] 3,799,018

[45] Mar. 26, 1974

[54] APPARATUS FOR CUTTING LENGTHS OFF A CONTINUOUSLY MOVING STRIP OF METAL

[75] Inventor: Michael Anthony Mumford, Ailsworth, England

[73] Assignee: Spalding Engineering Company Limited, Lincolnshire, England

[22] Filed: Apr. 18, 1972

[21] Appl. No.: 245,089

[52] U.S. Cl.............. 83/298, 83/320, 83/403.1, 83/436, 83/734
[51] Int. Cl............................................. B23d 25/10
[58] Field of Search ......... 83/298, 295, 320, 403.1, 83/734, 436

[56] References Cited
UNITED STATES PATENTS

| | | | |
|---|---|---|---|
| 3,251,255 | 5/1966 | Bauman | 83/295 |
| 3,310,855 | 3/1967 | Orioli | 83/295 X |

Primary Examiner—J. M. Meister
Attorney, Agent, or Firm—Brumbaugh, Graves, Donohue & Raymond

[57] ABSTRACT

Guillotine apparatus of the flying shear type has its drive means for moving a rod like workpiece through the machine driven synchronously with operation of the flying shear means by hydraulic control means from a common source of hydraulic pressure.

8 Claims, 6 Drawing Figures

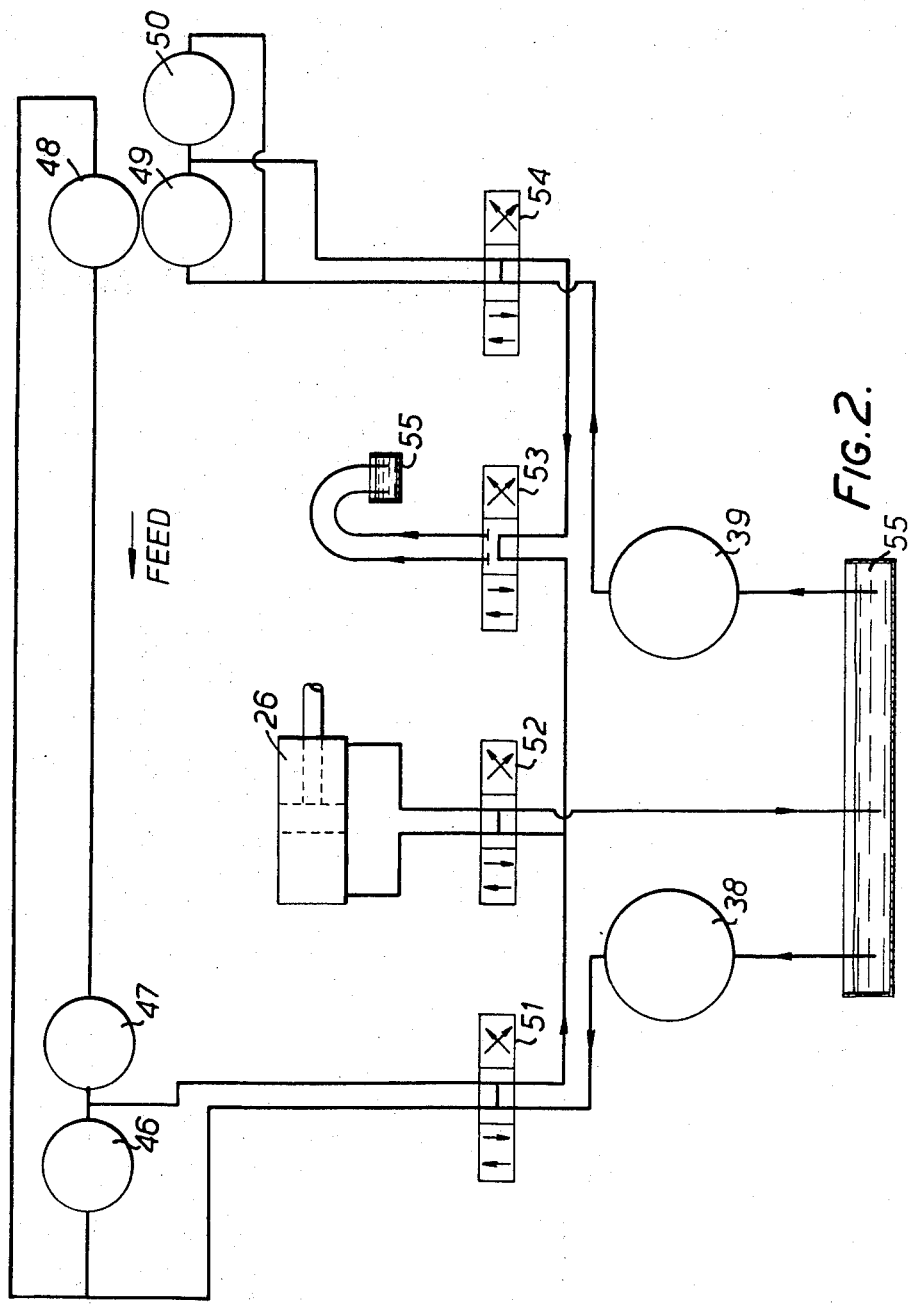

APPARATUS FOR CUTTING LENGTHS OFF A CONTINUOUSLY MOVING STRIP OF METAL

This invention relates to apparatus for a flying shear guillotine for cutting lengths off a continuously moving rod or wire and more to machines for decoiling wire and cutting the wire into predetermined lengths.

The invention provides a flying shear guillotine apparatus for cutting lengths off a continuously moving rod or wire, comprising hydraulic drive means for moving the rod or wire through the apparatus and an hydraulically operated flying shear arrangement for cutting the rod or wire, wherein the drive means and flying shear are actuated in synchronism by a common source of hydraulic pressure.

One form of apparatus according to the invention in the form of a decoiling machine will now be described, by way of example, with reference to the accompanying drawings in which:

FIG. 2 is a diagram of the hydraulic system of the machine.

Figure 1A:
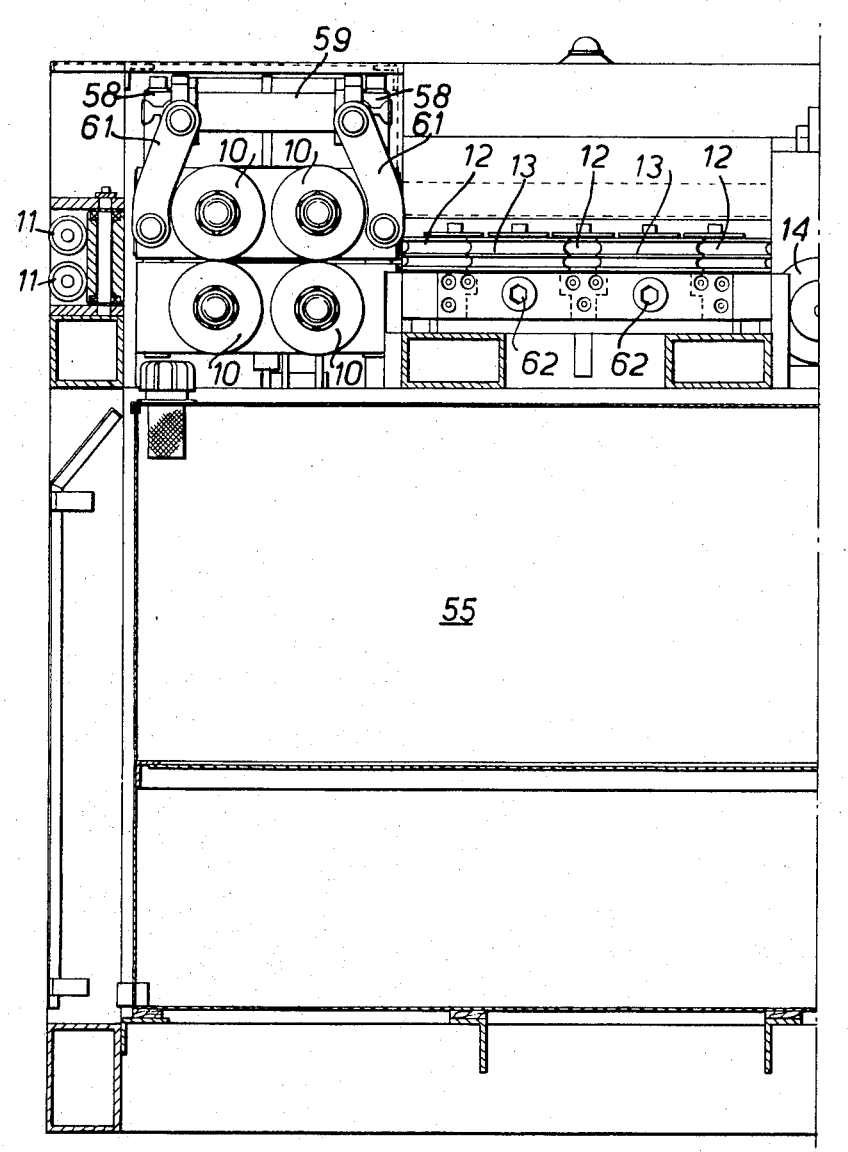
FIGS. 1a, 1b and 1c show a side elevation of the machine with the covers removed.
Figure 1B:
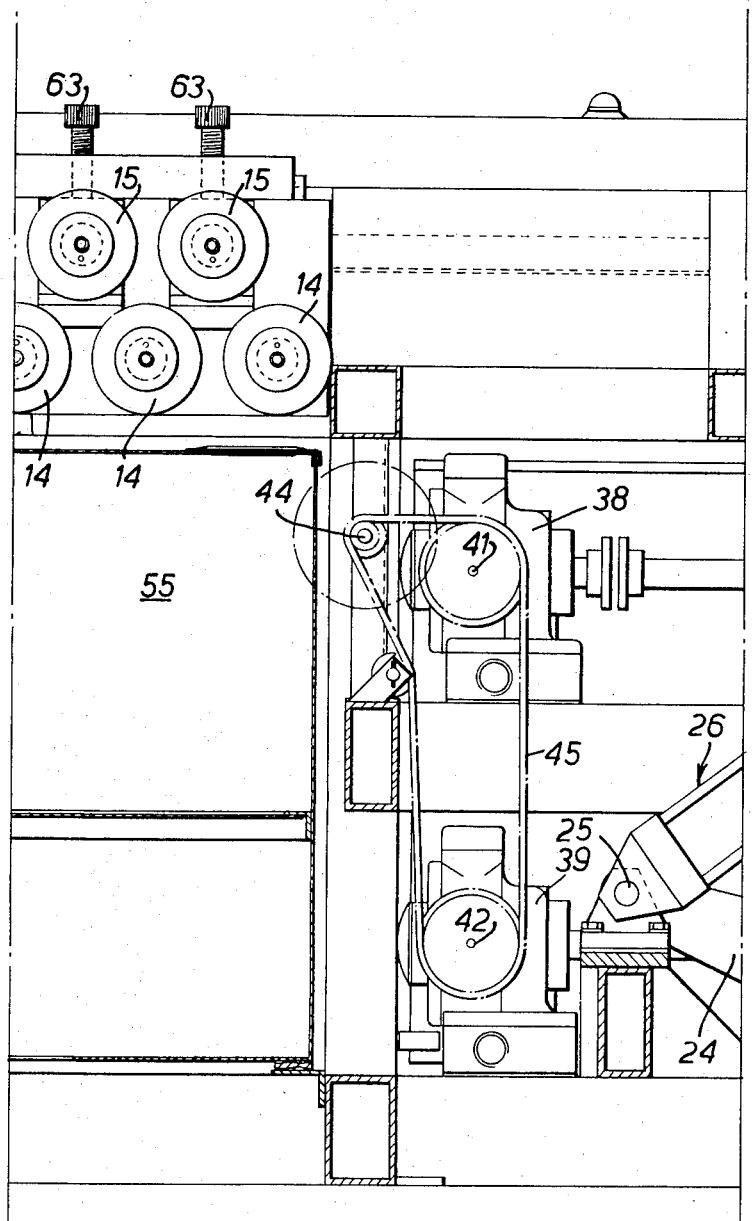
Figure 1C:
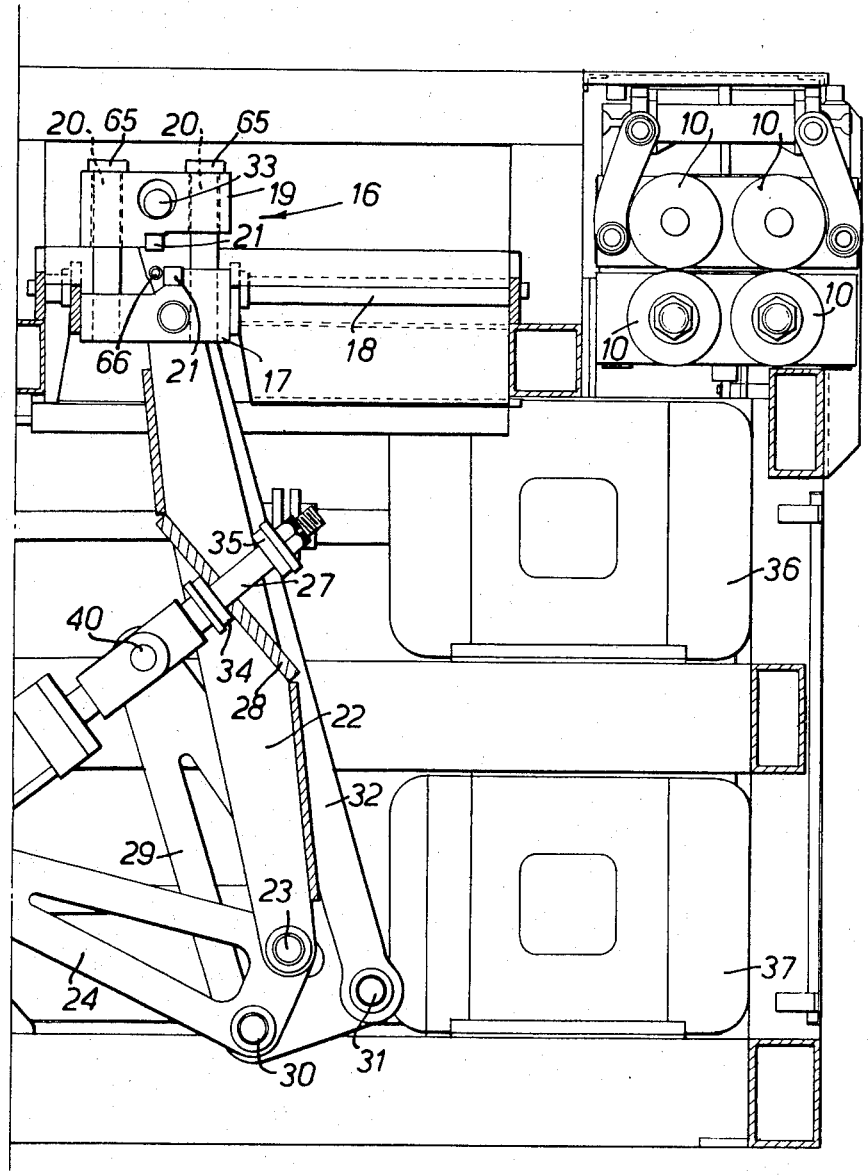

The machine consists basically of two lots of driving rollers 10, one at each end of the machine for driving a length of coiled wire through the machine; The wire enters the machine between two guide rollers 11 at the left hand side of the machine as seen in FIG. 1. The driving rollers 10 drive the wire between two sets of straightening rollers 12 and 13, and 14 and 15 at right angles to each other. In passing between these rollers, the wire is bent slightly both ways in two directions at right angles to each other so as to remove any kinks in the wire. The wire is then cut into shorter lengths by a flying shear guillotine arrangement 16 and the cut lengths fed out of the machine by the drive rollers 10 at the right hand end of the machine. The guillotine arrangement 16 consists of a lower cutting head 17 running freely on a pair of horizontal guide rods 18 and an upper cutting head 19 running freely on a pair of vertical guide rods 20 fixed to the lower cutting head 17. Fixed to the upper and lower cutting heads are co-operating blades 21. Pivotally connected to the lower cutting head 17 is a column 22 which is connected by a pivot pin 23 to a radius arm 24 connected to a fixed support by a pivot pin 25. Also connected to the fixed support by the pin 25 is a hydraulic piston and cylinder device 26, the piston rod 27 of which passes through a hole in a plate 28 attached to the column 22. The piston 27 is articulated at pin 40 and is also pivotally attached to a bell crank 29 which is pivoted by a pin 30 to the radius arm 24. Connected to the bell crank 29 by pin 31 is a tie bar 32 which is connected by a loose pivotal connection 33 to the upper cutting head 19. When hydraulic pressure is applied to the piston and cylinder device 26 to extend the piston rod 27, an abutment member 34 attached to the piston rod 27 abuts the plate 28 and moves the column 22 and guillotine arrangement forwards. The bell crank 29 connected to the piston rod 27 pivots about pin 30 thereby lowering pin 31 to move the tie bar 32 and operate the guillotine.

When the piston rod 27 of the piston and cylinder device 26 is retracted the guillotine arrangement continues to move with the wire as the rod 27 slides through the hole in the plate 28 attached to the column 22. Bell crank 29 is thus moved and opens the guillotine. Once the guillotine is open and the wire from the straightening rollers can pass between the blades 21, an abutment member 35 fixed to the piston rod 27, abuts the other side of the plate 28 At the same time the cutting head 19 contacts stops 65 attached to the guide rods 20. This causes an interaction between the columns 22 and 32, the column 22 taking a load in tension and the column 32 in compression and the piston and cylinder device 26 draws the guillotine arrangement back to its starting position through the locking interaction of the columns. The stop 35 applies an initial pull to the column 22 through the plate 28 to start the guillotine arrangement 16 moving, but the pull arising through the interaction between the columns 22 and 32 moves the guillotine arrangement along the horizontal guide rods 18 at a greater rate than the stop 35 so that the stop 35 leaves contact with the plate 28 and the plate 28 contacts the stop 34 by the time the guillotine arrangement has reached its starting position. A bar 66 fixed to the tie bar 32 ensures that the cut end of the wire passes over the lower blade 21 when the guillotine opens. The column 22, radius arm 24, bell crank 29 and tie bar 32 are all made in two parts laterally spaced from each other by spacers on the connecting pins.

The piston and cylinder device 26 and the motors operating the driving rollers 10 are operated hydraulically. Two electric motors 36 and 37 drive two hydraulic pumps 38 and 39 which can be set to a given pressure and can reduce their displacement to zero if necessary to maintain the pressure constant. These pumps have a variable displacement which is varied by rotation of shafts 41 and 42. These shafts 41 and 42 are rotated in unison by rotation of a handle 43 (FIG. 3) on the outside of the casing. The handle 43 is connected to a shaft 44 which is connected to the shafts 41 and 42 by means of a chain drive 45. Referring now more especially to FIG. 2, the pumps 38 and 39 pump oil from a reservoir tank 55 to operate hydraulical motors 46, 47, 48, 49 and 50 which drive the driving rollers 10. The operation is controlled by solenoid operated forward-/neutral/reverse valves 51, 52, 53 and 54 (not visible in FIGS. 1 and 3). Valve 53 is switched off in its neutral position as shown. In either its forward position or its reverse position it allows a double passage to the reservoir 55. Motors 47 and 48 are in series and drive, driving rollers at opposite ends of the machine to ensure that the driving rollers at both ends of the machine run at similar speeds and that a measure of torque transfer can take place. The valve 52 controls operation of the guillotine 16. A wheel (not shown) runs on the wire passing through the machine for measuring the length of wire as it passes through the machine and an electronic pick-up sends signals to a control system which controls operation of the valves 51–54. When a predetermined length of wire has passed through the machine the valve 52 is opened in the forward direction and the guillotine is operated. The valve 52 is then reversed to release the guillotine jaws and return the guillotine to its starting position. The piston and cylinder device 26 and the parts 22, 24, 29, 32 are suitably dimensioned so that the guillotine head moves at the same speed as the wire passing through the machine, whatever that should be. When valve 53 is open the motors 46–50 work at full speed, but the valve 53 is closed before operation of the guillotine to slow the wire sufficiently to prevent too high a speed of reciprocation of the guillotine head. The speed of operation of the machine can be adjusted by adjusting the displacement of the pumps 38 and 39 and no separate adjustment of the guillotine mechanism is necessary.

A device (not shown) is provided to prevent the valve 53 being opened, and the machine working at high speed, when lengths of wire less than 100 inches are being cut so as to avoid "hunting."

Figure 3:
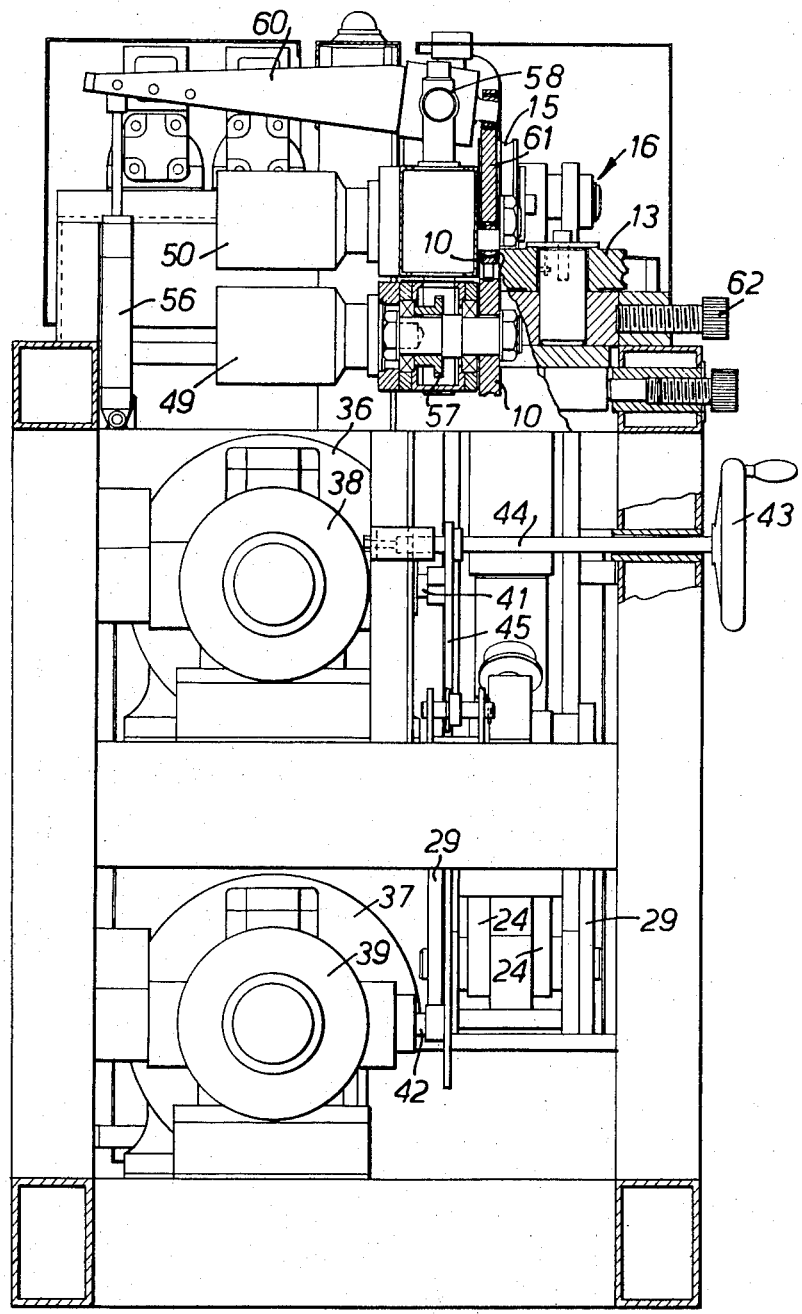
FIG. 3 is an end elevation with the cover removed and partly in section.

Referring now to FIG. 3, the pressure between the driving rollers 10 is provided by a hydraulic piston and cylinder 56 connected to the hydraulic system on the inlet side of the pumps so that the pressure between the driving rollers is proportional to the pressure required by the driving motors 46–50 to pass the wire through the machine. The rollers 10 will therefore never slip whatever size wire is being straightened. The pumps 38 and 39 are set to a pressure just above that required to straighten the largest wire that the machine is designed for, so that it is impossible to break the machine by overloading. The motor 49 is fixed in position and drives directly one of the driving rollers 10. It is coupled to the adjacent roller 10 on the same level by means of a chain and sprocket 57. This adjacent roller is also driven by the motor 48 which is operated in series with the motor 47 at the other end of the machine to ensure that the rollers 10 at both ends run at similar speeds and that a measure of torque transfer can take place. The motor 49 drives a roller 10 directly and the adjacent roller 10 on the same level through a sprocket and chain connection. The motor 58 and the rollers 10 which it drives are freely mounted for vertical movement on rods 58. Between the rods 58 is mounted a bar 59 (see FIG. 1) about which a lever 60 is pivoted. The rear end of the lever 60 is connected to the piston rod of the hydraulic piston and cylinder device 56. The front end of the lever is connected to two links 61 which are connected to the motor unit (46) for transmitting force to the top driving rollers 10 from the hydraulic piston and cylinder device 56. The lever 60 has a ratio of approximately 6:1.

The arrangement of the driving motors at the other end of the machine is similar. However there are only two motors 46 and 47 at that end.

The straightening rollers 12,13,14 and 15 are mounted for free rotation and the positions of the rollers 13 and 15 can be adjusted by means of screw adjustments 62 and 63 respectively. The straightening rollers have two grooves for different size wires. To change from one groove to the other the rollers are taken off and put on the other way up.

Figure 4:
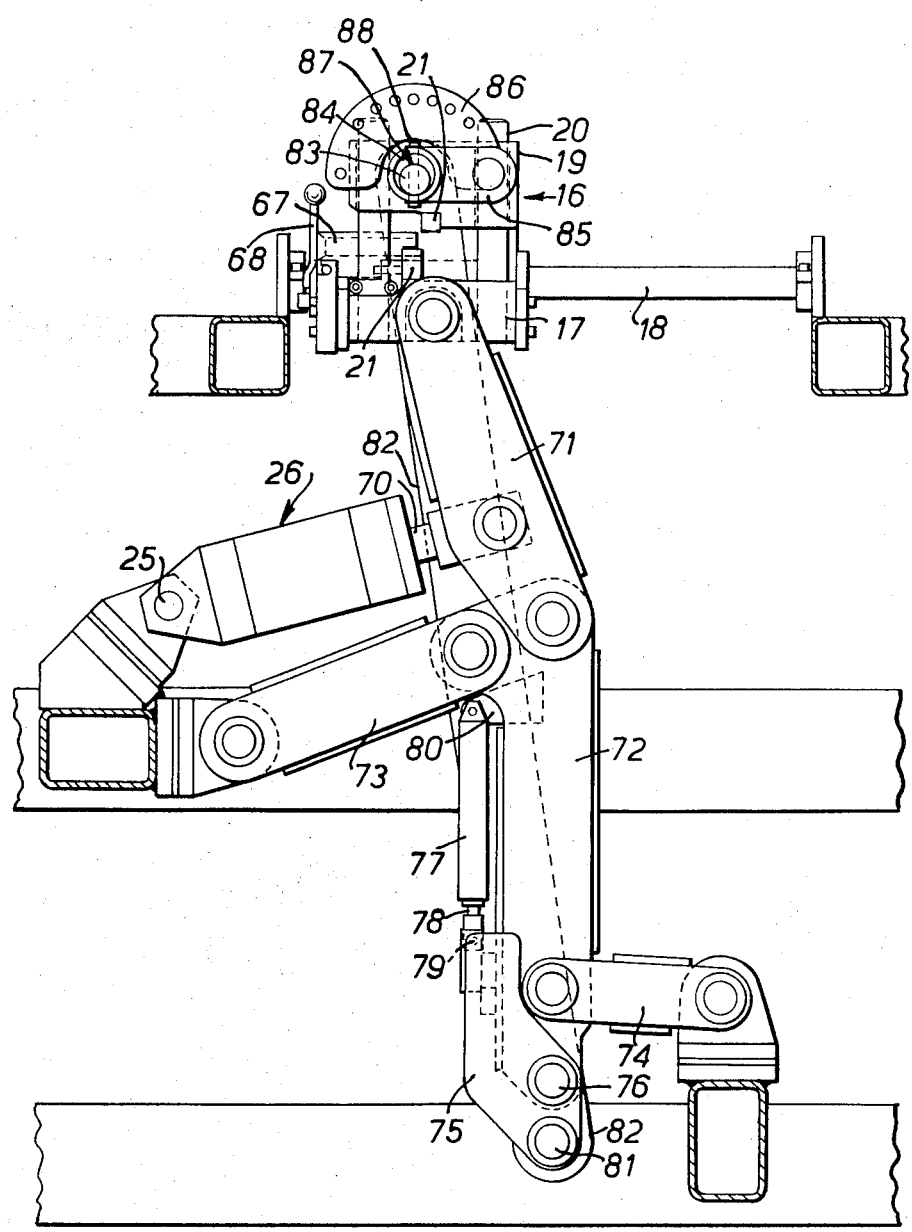
FIG. 4 is a side elevation of a modified form of guillotine arrangement and drive therefor.

FIG. 4 shows a modified form of guillotine arrangement and arrangements for actuating it, and corresponding parts are given the same reference numerals.

The lower blade 21 is grooved and a wire guide 67 appropriate to the size of wire being cut is held in the lower cutting head 17 by a quick release catch 68.

The piston rod 70 of the piston and cylinder device 36 is pivotally connected to a toggle link 71 which is pivotally connected at its upper end to the lower cutting head 17 and at its lower end to a column 72. Column 72 is restrained by two links 73 and 74 each pivotally attached at one end to the column 72 and at the other end to a part of the fixed structure of the machine. A swinging link 75 is coupled to the lower end of the column 72 by a pivot pin 76. A piston and cylinder device 77 has its piston rod 78 coupled to the swinging link 75 by a pivot pin 79 and its cylinder pivotally coupled to a part 80 fixed to the column 72. Operation of the piston and cylinder device 77 pivots the swinging link 75 about the pivot pin 76. Coupled to the bottom of the swinging link 75 by a pin 81 is a pair of tie bars 82 which at their top end are pivotally connected to the upper cutting head 19 in a manner that permits adjustment of the height of the upper cutting head 19 above the lower cutting head 17.

A pin 87 having a large diameter central portion 84 is rotatably mounted at the central portion 84 in the upper cutting head 19. At either end of the central portion 84 is a smaller eccentric portion 83 to which the upper ends of the tie bars 82 are respectively coupled A lever 85 is non-rotatably connected to central portion 84 of the pin 87 by a coupling pin 88, so that rotation of the lever 85 rotates the pin 87 thereby raising or lowering the eccentric portions 83 and adjusting the open position of the upper cutting head 19. An index plate 86 has holes with which the lever 85 can engage to lock the pin 87 in the desired position When the piston and cylinder device 26 is operated the toggle link 71 moves to the right as seen in FIG. 4 pivoting about its pivotal connection with the column 72 and moves the guillotine arrangement 16 to the right along the guide rods 18. Since the guillotine arrangement 16 is constrained by the guide rods 18 to move in a horizontal plane, the toggle link 71 is moved downwardly together with the column 72 and swinging link 75. This pulls the tie bars 82 and hence the upper cutting head 19 downwards to cut the wire. The upper cutting head 19 reaches its lower most position when the toggle link 71 and column are aligned. As the toggle link 71 passes this aligned position, the column 12, swinging link 72, tie bars 82 and hence the upper cutting head 19 move upwardly thereby opening the guillotine jaws and allowing the wire to pass between the jaws.

The piston and cylinder device 26 is reversed and simultaneously the piston and cylinder device 77 is actuated. This pivots the swinging link 75 about pin 76 and thereby raises the tie bars 82 and hence the upper cutting head 19, so that the guillotine jaws do not reclose on the wire as the toggle link 71 returns the guillotine arrangement to the starting end of the guide rods 18. Once back in this position, the piston and cylinder device 77 is reversed so that the upper cutting head 19 is returned to its normal starting position ready for the next cutting operation.

The invention is not restricted to the details of the foregoing description.

The wire may be straightened by spinner straightening by means of a rotating drum with offset dies through which the wire passes.

I claim:

1. Flying shear guillotine apparatus for cutting lengths off a continuously moving rod-like workpiece, comprising hydraulically powered drive roller means for moving the workpiece through the apparatus, an hydraulically operated flying shear means for cutting the workpiece, and control means operative to actuate said drive means and said flying shear means in synchronisms from a common source of hydraulic pressure.

2. Apparatus according to claim, 1 wherein said flying shear means comprises a first guillotine jaw mounted for movement parallel to the direction of movement of said workpiece, a second guillotine jaw mounted on said first guillotine jaw for movement at right angles to the direction of movement of said first guillotine jaw, an hydraulic actuator, and link means operatively connecting said hydraulic actuator to said first and second guillotine jaws, that on actuation of the hydraulic actuator, in such a manner that said guillotine jaws are moved at the same velocity as the workpiece is driven by said drive means, and said second jaw is moved towards said first jaw to sever said workpiece.

3. Apparatus according to claim 2, wherein said hydraulic actuator is connected in series with said hydraulically powered drive roller means for operation of said flying shear means.

4. Apparatus according to claim 1, further comprising a variable displacement hydraulic pump for providing the said common source of hydraulic pressure.

5. Apparatus according to claim 1, wherein said hydraulically powered drive roller means comprises a pair of adjacent drive wheels between which said workpiece is passed and frictionally engaged and each of which is driven by an hydraulic motor, and wherein one said drive wheel is movable towards and away from the other and is biassed towards the other drive wheel by hydraulic biassing means supplied by the same hydraulic pressure as the drive means, so that the friction grip between the drive wheels and the workpiece is increased with the drive speed.

6. Apparatus according to claim 1, including respective hydraulically powered drive roller means disposed on either side of said flying shear, and wherein an hydraulic motor on one side of the flying shear is coupled in series with an hydraulic motor on the other side of said flying shear.

7. Apparatus according to claim 2, including control means arranged to limit the speed of operation of said hydraulically powered drive roller means immediately prior to a cutting operation to limit the velocity of said guillotine jaws.

8. Apparatus according to claim 2, wherein said workpiece is driven generally horizontally and said link means comprises: a first link pivotally connected at its upper end to said first guillotine jaw and to said hydraulic actuator; a second, vertically movable link pivotally connected at its upper end to the lower end of said first link; a tie bar connecting said second link to said second jaw, so that on actuation of the hydraulic actuator, said first link moves said guillotine jaws horizontally, the lower end of said first link, and hence the second link, tie bar and second jaw initially moving downwardly until the first and second links are aligned, and then moving upwardly after passing the aligned position.

* * * * *